United States Patent
Sharangpani et al.

(10) Patent No.: US 7,451,143 B2
(45) Date of Patent: Nov. 11, 2008

(54) PROGRAMMABLE RULE PROCESSING APPARATUS FOR CONDUCTING HIGH SPEED CONTEXTUAL SEARCHES AND CHARACTERIZATIONS OF PATTERNS IN DATA

(75) Inventors: Harshvardhan Sharangpani, Santa Clara, CA (US); Rajesh Patil, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 10/650,363

(22) Filed: Aug. 27, 2003

(65) Prior Publication Data

US 2004/0059725 A1    Mar. 25, 2004

Related U.S. Application Data

(60) Provisional application No. 60/406,834, filed on Aug. 28, 2002.

(51) Int. Cl.
G06F 17/30 (2006.01)
G06F 7/38 (2006.01)

(52) U.S. Cl. .................................. 707/6; 707/3; 326/39
(58) Field of Classification Search .................. 707/6, 707/3; 712/220, 224, 10, 16; 377/54; 326/39
See application file for complete search history.

(56) References Cited

U.S. PATENT DOCUMENTS

| | | | |
|---|---|---|---|
| 4,550,436 A | * | 10/1985 | Freeman et al. ............. 382/218 |
| 4,760,523 A | | 7/1988 | Yu et al. |
| 4,965,472 A | | 10/1990 | Anderson |
| 5,050,075 A | * | 9/1991 | Herman et al. .................. 707/6 |
| 5,051,947 A | * | 9/1991 | Messenger et al. ............. 707/3 |
| 5,060,143 A | * | 10/1991 | Lee ................................ 707/6 |
| 5,101,376 A | | 3/1992 | Noguchi et al. |
| 5,163,016 A | | 11/1992 | Har'El et al. |
| 5,452,451 A | | 9/1995 | Akizawa et al. |
| 5,497,488 A | * | 3/1996 | Akizawa et al. ................. 707/6 |
| 5,586,288 A | * | 12/1996 | Dahlberg ...................... 711/108 |

(Continued)

FOREIGN PATENT DOCUMENTS

EP    0 488 497 A2    6/1992

(Continued)

OTHER PUBLICATIONS

T. Matoba et al., "A Rapid Turnaround Design of a High Speed VLSI Search Processor," Integration, the VLSI Journal, Feb. 10, 1991, pp. 319-337, vol. 10, No. 3, North-Holland Publishing Company, Amsterdam, NL.

(Continued)

Primary Examiner—Miranda Le
Assistant Examiner—Robert Timblin
(74) Attorney, Agent, or Firm—Blakely, Sokoloff, Taylor & Zafman LLP

(57) ABSTRACT

A method and apparatus is disclosed herein for a rule processor for conducting contextual searches, the processor comprising a plurality of input payload search registers, search execution engine coupled to the plurality of search registers to perform one or more contextual searches on content in the search registers by via parallel pattern matching in response to executing rules specifying the one or more searches, and presenting one or more patterns to the content in the search registers.

71 Claims, 9 Drawing Sheets

U.S. PATENT DOCUMENTS

| | | | |
|---|---|---|---|
| 5,619,718 A | | 4/1997 | Correa |
| 5,623,680 A | | 4/1997 | Flora-Holmquist et al. |
| 5,649,149 A | | 7/1997 | Stormon et al. |
| 5,822,608 A | * | 10/1998 | Dieffenderfer et al. ........ 712/20 |
| 5,905,902 A | | 5/1999 | O'Connor |
| 5,949,251 A | | 9/1999 | Chambers |
| 5,974,525 A | | 10/1999 | Lin et al. |
| 6,070,252 A | | 5/2000 | Xu et al. |
| 6,212,625 B1 | | 4/2001 | Russell |
| 6,253,112 B1 | | 6/2001 | Flora-Holmquist et al. |
| 6,266,634 B1 | | 7/2001 | Buchsbaum et al. |
| 6,269,189 B1 | * | 7/2001 | Chanod ...................... 382/229 |
| 6,327,508 B1 | | 12/2001 | Mergard |
| 6,380,924 B1 | | 4/2002 | Yee et al. |
| 6,700,809 B1 | | 3/2004 | Ng et al. |
| 6,742,107 B2 | | 5/2004 | Jinzaki |
| 6,952,694 B2 | | 10/2005 | Mathur et al. |
| 7,085,918 B2 | | 8/2006 | Sharangpani et al. |
| 7,119,577 B2 | | 10/2006 | Sharangpani |
| 2002/0087537 A1 | | 7/2002 | Evans |
| 2002/0194223 A1 | * | 12/2002 | Meyers et al. ............... 707/513 |
| 2003/0120480 A1 | | 6/2003 | Mohri et al. |
| 2003/0125931 A1 | * | 7/2003 | Campbell .................... 704/10 |
| 2004/0059443 A1 | | 3/2004 | Sharangpani |
| 2005/0012521 A1 | | 1/2005 | Sharangpani |

FOREIGN PATENT DOCUMENTS

| | | |
|---|---|---|
| WO | WO 94/19757 | 9/1994 |
| WO | WO 2004/021181 A2 | 3/2004 |
| WO | WO 2004/063886 A2 | 7/2004 |

OTHER PUBLICATIONS

International Search Report dated Nov. 4, 2004 (6 pages).

Danield Jurafsky and James H. Martin, "Speech and Language Processing: An Introduction to Natural Language Processing, Computational Linguistics, and Speech Recognition," Prentice Hall Inc., pp. i-xxvi and 1-90 (2000).

Alfred V. Aho, et al., "Compilers: Principles, Techniques, and Tools," Addison-Wesley Publishers, pp. i-x, and 83-278 (Mar. 1988).

* cited by examiner

Example pseudo-code and Rule Engine micro-code

Pseudo-code 601

FIND ((("cp /bin/sh /usr/spool/mail/root" *BEFORE* "chmod 4755 !$") *AND* "touch") *BEFORE* "mail"

Micro-code for an exemplary Rule Engine

| | Opcode | Pattern | Mask | Start Offset | Start Offset Indirect | End Offset | End Offset Indirect | Result Register | Branch Address |
|---|---|---|---|---|---|---|---|---|---|
| 1 | FIND_FIRST_FORWARD | "cp /bin/" | 0xFF | 0x03D | 0 | 0x800 | 0 | A | 0xB |
| 2 | FIND_FORWARD_ANCHORED | "sh /usr/" | 0xFF | <A + 8> | 1 | 0x800 | 0 | A | 0xB |
| 3 | FIND_FORWARD_ANCHORED | "spool/ma" | 0xFF | <A + 8> | 1 | 0x800 | 0 | A | 0xB |
| 4 | FIND_FORWARD_ANCHORED | "il/root" | 0xFE | <A + 8> | 1 | 0x800 | 0 | A | 0xB |
| 5 | FIND_FIRST_FORWARD | "chmod 47" | 0xFF | <A + 7> | 1 | 0x800 | 0 | A | 0xB |
| 6 | FIND_FORWARD_ANCHORED | "55 !$" | 0xF8 | <A + 8> | 1 | 0x800 | 0 | A | 0xB |
| 7 | FIND_FIRST_FORWARD | "touch" | 0xF8 | 0x03D | 0 | 0x800 | 0 | B | 0xA |
| 8 | CMP(B+5, A+5)_BRANCH(10) | - | - | - | - | - | - | - | 0xB |
| 9 | FIND_FIRST_FORWARD | "mail" | 0xF0 | <A + 5> | 1 | 0x800 | 0 | C | 0xB |
| 10 | FIND_FIRST_FORWARD | "mail" | 0xF0 | <B + 5> | 1 | 0x800 | 0 | C | 0xB |

FIG. 6

Execution of example micro-code: pipeline diagram

| | Clock 1 | Clock 2 | Clock 3 | Clock 4 | Clock 5 | Clock 6 | Clock 7 | Clock 7 | Clock 8 | Clock 9 | Clock 10 | Clock 11 | Clock 12 | Clock 13 | Clock 14 |
|---|---|---|---|---|---|---|---|---|---|---|---|---|---|---|---|
| Fetch | 1 | 2 | 3 | 4 | 5 | 6 | 7 | 8 | - | - | - | 10 | - | - | - |
| Assemble | - | 1 | 2 | 3 | 4 | 5 | 6 | 7 | 8 | - | - | - | 10 | - | - |
| Search/Execute | - | - | 1 | 2 | 3 | 4 | 5 | 6 | 7 | 8 | - | - | - | 10 | - |
| Sort & Branch | - | - | - | 1 | 2 | 3 | 4 | 5 | 6 | 7 | 8 | - | - | - | 10 |

FIG. 7

PROGRAMMABLE RULE PROCESSING APPARATUS FOR CONDUCTING HIGH SPEED CONTEXTUAL SEARCHES AND CHARACTERIZATIONS OF PATTERNS IN DATA

This application is a non-provisional application of U.S. Provisional Patent Application Ser. No. 60/406,834, filed Aug. 28, 2002.

FIELD OF THE INVENTION

The present invention relates to the field of information processing, specifically the field of content analytics and processing.

BACKGROUND OF THE INVENTION

Significant trends in computing and communications are leading to the emergence of environments that abound in content analytics and processing. These environments require high performance as well as programmability on a certain class of functions, namely searching, parsing, analysis, interpretation, and transformation of content in messages, documents, or packets. Notable fields that stress such rich content analytics and processing include content-aware networking, content-based security systems, surveillance, distributed computing, wireless communication, human interfaces to computers, information storage and retrieval systems, content search on the semantic web, bio-informatics, and others.

The field of content-aware networking requires searching and inspection of the content inside packets or messages in order to determine where to route or forward such packages and messages. Such inspection has to be performed on in-flight messages at "wire-speed", which is the data-rate of the network connection. Given that wire rates in contemporary networks range from 100 Mbits/second all the way to 40 Gbits/second, there is tremendous pressure on the speed at which the content inspection function needs to be performed.

Content-based security systems and surveillance and monitoring systems are required to analyze the content of messages or packets and apply a set of rules to determine whether there is a security breach or the possibility of an intrusion. Typically, on modern network intrusion detection systems (NIDS), a large number of patterns, rules, and expressions have to be applied to the input payload at wire speed to ensure that all potential system vulnerabilities are uncovered. Given that the network and computing infrastructure is continuously evolving, fresh vulnerabilities continue to arise. Moreover, increasingly sophisticated attacks are employed by intruders in order to evade detection. Intrusion detection systems need to be able to detect all known attacks on the system, and also be intelligent enough to detect unusual and suspicious behavior that is indicative of new attacks. All these factors lead to a requirement for both programmability as well as extremely high performance on content analysis and processing.

With the advent of distributed and clustered computing, tasks are now distributed to multiple computers or servers that collaborate and communicate with one another to complete the composite job. This distribution leads to a rapid increase in computer communication, requiring high performance on such message processing. With the emergence of XML (Extensible Markup Language) as the new standard for universal data interchange, applications communicate with one another using XML as the "application layer data transport". Messages and documents are now embedded in XML markup. All message processing first requires that the XML document be parsed and the relevant content extracted and interpreted, followed by any required transformation and filtering. Since these functions need to be performed at a high message rate, they become computationally very demanding.

With the growth of untethered communication and wireless networks, there is an increase in the access of information from the wireless device. Given the light form factor of the client device, it is important that data delivered to this device be filtered and the payload be kept small. Environments of the future will filter and transform XML content from the wireline infrastructure into lightweight content (using the Wireless Markup Language or WML) on the wireless infrastructure. With the increasing use of wireless networks, this content transformation function will be so common that an efficient solution for it's handling will be needed.

Another important emerging need is the ability to communicate and interact with computers using human interfaces such as speech. Speech processing and natural language processing is extremely intensive in content searching, lexical analysis, content parsing, and grammar processing. Once a voice stream has been transduced into text, speech systems need to apply large vocabularies as well as syntactic and semantic rules on the incoming text stream to understand the speech.

The emergence and growth of the worldwide web has placed tremendous computational load on information retrieval (IR) systems. Information continues to be added to the web at a high rate. This information typically gets fully indexed against an exhaustive vocabulary of words and is added to databases of search engines and IR systems. Since information is continuously being created and added, indexers need to be "always-on". In order to provide efficient real-time contextual search, it is necessary that there be a high performance pattern-matching system for the indexing function.

Another field that stresses rich content analytics and processing is the field of bio-informatics. Gene analytics and proteomics entail the application of complex search and analysis algorithms on gene sequences and structures. Once again, such computation requires high performance search, analysis, and interpretation capability.

Thus, emerging computer and communications environments of the future will stress rich analysis and processing of content. Such environments will need efficient and programmable solutions for the following functions—searching, lexical analysis, parsing, characterization, interpretation, filtering and transformation of content in documents, messages, or packets.

Central to these rich content processing functions are operations to perform contextual and content-based search and navigation, and rich associative lookup.

In the prior art, search and lookup processing has typically has been performed in one of two ways. First, such processing has been performed using fixed application specific integrated circuits (ASIC) solutions using a combination of content addressable memories (CAMs), comparator hardware and dedicated logic. For example, search rules are stored in a content-addressable memory, and the data is streamed across the structure, shifting it 1 byte or 1 word at a time. Alternatively, specific comparators are arranged at fixed locations to recognize specific values in the incoming data. Incidences of matches are recorded and consumed by the dedicated logic as per the requirements of the target application. Although the fixed ASIC approach can increase performance, it lacks easy programmability, and hence its application is severely restricted. Furthermore, the expense associated with designing and tailoring specific chips for each targeted solution is prohibitive.

Second, traditional general-purpose microprocessors have been used to handle rich search and lookup functions and associated content processing. Microprocessors are fully programmable devices and are able to address the evolving needs of problems—by simply reprogramming the software the new functionality can be redeployed. However, the traditional microprocessor is limited in the performance level it can offer to rich content analytics and processing.

The limitation in performance on content analytics is inherent in the design and evolution of the microprocessor architecture. The microprocessor originated as a computing unit, performing arithmetic operations on 1,2,4,8 byte words. Subsequently, as the field of computing evolved, more functionality was progressively added to the microprocessor to address emerging fields. As a result, the general purpose microprocessor is functional across a very wide range of applications, but not very well tuned for any one in particular. Fundamentally, as it applies to the needs of content analytics, the microprocessor architecture has two key limitations—(1) it lacks the capability to simultaneously perform massively parallel and fine-grain pattern-matching and comparison operations on large datasets, and (2) it lacks the capability to make rapid and multiple state transitions and efficient multi-directional control flow changes based on input data.

The instruction set of the microprocessor is a scalar instruction set, such that instructions need to be executed in a single ordered sequence. The instruction sets of typical microprocessors enable the comparison of a single 64-bit quantity stored in a register with another 64-bit quantity stored in a different register. The comparison is performed with the two operands aligned. If the comparison is being performed for the purpose of a pattern search, then it needs to be invoked repeatedly after shifting one or both of the operands by a variable number of bytes each time. Often, such repeated shifting is performed in a loop with a control flow change that transfers control from the code at the bottom of the loop to the code at the top of the loop on each iteration. Control flow changes in the microprocessor are accomplished by branching to a fresh sequence of code. Since modern microprocessors are highly pipelined (of the order of 20-30 stages in products like the Pentium III and Pentium IV processors from Intel Corporation of Santa Clara, Calif.), the performance penalty incurred due to branching is significant. The entire microprocessor pipeline needs to be flushed on a taken branch. Sophisticated branch prediction techniques hence need to be applied on such processors to keep the pipeline sufficiently fed with instructions from the desired path in the wake of control flow changes. However, most branch prediction techniques provide only empirical and statistical performance improvements, such that control flow changes for the most part introduce a slowdown as well as non-determinism in the performance level that can be delivered.

A number of search and pattern matching algorithms have evolved to make best use of the microprocessor. The Boyer-Moore algorithm is widely regarded as one of the best-known techniques employed on a microprocessor to find occurrences of patterns in a given data set. The algorithm processes only one pattern at a time and must be repeatedly invoked if more than one pattern is to be searched in a data set. For each pattern to be searched, it advances sequentially through the data set making selective comparisons based on observations obtained from pre-characterizing the pattern. This algorithm provides superior performance relative to other pattern matching algorithms by reducing the total number of comparisons within a given data set. However, due to the sequential nature of the algorithm, the performance is limited by fundamental constraints of microprocessor architecture, namely the scalar instruction set and the penalty incurred on branching.

Owing to the aforementioned architectural limitations of the microprocessor, the efficiency and capability of conventional microprocessors are severely challenged by the emerging computing and communications environments described earlier. Several data points can be provided to support these arguments. For example, in a Network Intrusion Detection System (NIDS) such as Snort, it is already desirable to apply signature detection of hundreds of strings on incoming packets. Performing this workload with signatures of 8-byte patterns on a 3 GHz Pentium IV processor in a commercial microprocessor-based system that employs an improved version of the Boyer-Moore pattern matching algorithm limits the packet rate to less than 50 Mbps. Likewise, parsing of XML documents on such a platform is limited to the 10 MB/s range, and speech processing is limited to 1 real-time stream on restricted grammars and vocabularies. These data points indicate that the conventional microprocessor of 2003 or 2004 will be able to deliver rich content analytics and processing at rates around the 100 Mbps range. However, by that timeframe, data rates of between 1 Gbps to 10 Gbps will not be uncommon in enterprise networks and environments. Clearly, there is a severe mismatch of one to two orders of magnitude between the performance that can be delivered by the conventional microprocessor and that which is demanded by the environment. While it is possible to employ multiple parallel microprocessor systems to execute some of the desired functions at the target rate, this greatly increases the cost of the system. There is clearly a need for a more efficient solution for these target functions.

There is a need for a new solution for a programmable processing apparatus that is more suitable for content analytics and processing, and that is efficient on a set of functions that include contextual search, lexical analysis, parsing, interpretation, and transformation of content on messages, packets, or documents.

SUMMARY OF THE INVENTION

A method and apparatus is disclosed herein for a rule processor for conducting contextual searches is described. In one embodiment, the processor comprises multiple input payload search registers and search execution hardware coupled to the search registers to perform one or more contextual searches on content in the search registers via parallel pattern matching in response to executing one or more instructions specifying the one or more pattern searches and presenting one or more patterns to the content in the search registers.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6 illustrates an example pseudo-code of a complex pattern matching rule-set and the corresponding micro-code for an exemplary rule-processor.

FIG. 7 illustrates the clock-by-clock pipelined execution of the micro-code shown in FIG. 6.

DETAILED DESCRIPTION OF THE PRESENT INVENTION

A programmable rule processing apparatus for conducting high-speed contextual searches of arbitrarily long patterns in a document, message, or other content is described. The rule processor provides an architecture that is tailored for content search and analysis. In one embodiment, the rule processor allows for rapid parallel and recursive sequencing of rules against a content payload, thereby enabling efficient processing of workloads intensive in rule-grammars.

Architecturally, the rule processor employs a set of input payload search registers. A search register file holds the input data (or content payload) that is to be presented to various search rules. Data can be loaded into the search registers from memory, or moved in and out of the search registers from and to other resources in the rule processor. In one embodiment, a variety of searches may be performed on the content of the search registers. These searches are specified in the form of search instructions or search rules that are presented to the payload data. Search execution hardware is coupled to the search registers. This hardware performs the pattern matching and processing functionality needed to compute the results of the search function.

Figure 1:
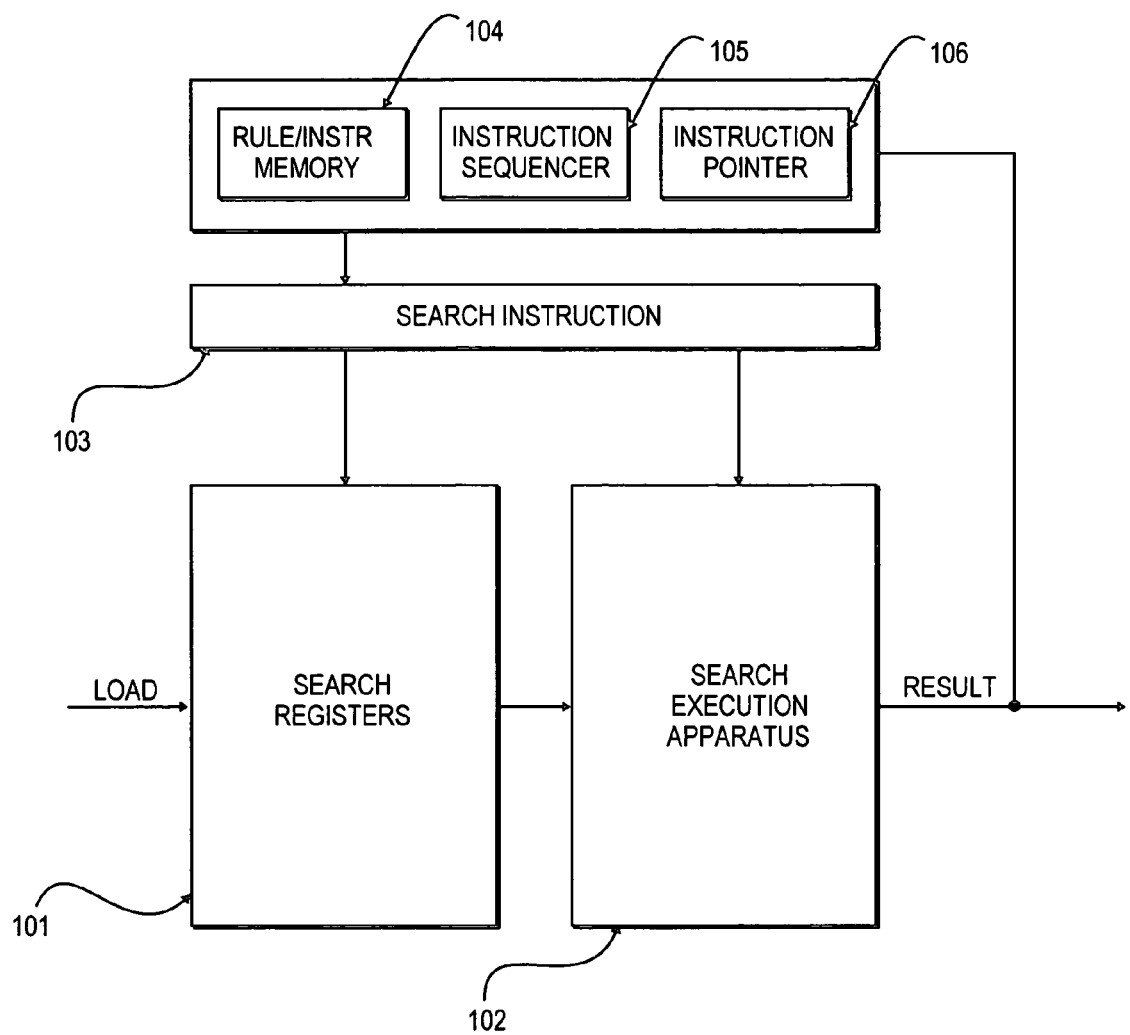
FIG. 1 is a block diagram of one embodiment of a rule processor with a search apparatus.

FIG. 1 is a block diagram of one embodiment of a rule processor comprising search registers 101 and search execution hardware 102. Search instruction 103 is presented to search registers 101 and search execution hardware 102. The processor further comprises of an instruction store referred to as rule/instruction memory 104 and an apparatus to control the flow of instructions that includes, in one embodiment, instruction sequencer 105 and instruction pointer 106.

In one embodiment, search registers 101 comprise a register file with 2K entries of 1 byte each, where the values in search registers 101 are addressed by an 11-bit register address. Therefore, 2 KB of content data to be searched may be loaded into search registers 101.

A typical search entails presentation of an instruction or rule to the search registers. The rule specifies a pattern along with one or more additional search parameters. In one embodiment, the search function returns a number of results. These include an indication of whether or not a match was found between the pattern and the content in the search registers, and also a match location indicating where in the payload search registers the match occurred.

Additional search control parameters are provided by the rule processor to search execution hardware 102. Search instructions might provide a mask vector along with a set of bytes comprising the target search pattern. The mask vector might be comprised of bits that correspond to the target pattern byte or bytes. In one embodiment, specific bytes in the target pattern to be ignored during the search operation are selected by setting the corresponding bits in the mask vector to a pre-determined logic level of 0 or 1. Thus, the target pattern used in the search may be reduced in size. Additionally, the rule processing instructions may specify starting and ending locations that constitute a search window or a range of bytes in search registers 101 within which the search is constrained.

Additional parameters to search instructions may include a branch address to be utilized by the rule processor in the event of an unsuccessful search. This feature would enhance the performance of the rule processor when searches of strings of bytes that are significantly longer than the width of the datapath of search execution hardware 102 fail without any matches or fail after matching only the first few bytes with the contents of search registers 101. The rule processor can skip over the remaining search instructions for the current string by branching to the instruction that follows the last search instruction for the current string.

An example of a search instruction is a windowed-find-first-forward instruction. In one embodiment, in a windowed-find-first-forward search, given an 8-byte pattern specified in or by a rule, an 8-bit mask, a starting location offset address pointing to a starting byte in the 2 KB of content data (e.g., document data) in search registers 101, and an ending location offset address pointing to a ending byte in the 2 KB of content data (e.g., document data) in search registers 101, the search returns the starting address (e.g., an 11 bit vector) in search registers 101 of the first string after the specified starting location address that matches the masked pattern, providing this address starts before the ending location offset address. In another example, a windowed-find-first-reverse search may be performed. In one embodiment, in a windowed-find-first-reverse search, given an 8-byte pattern in the rule, an 8-bit mask, a starting location offset address pointing to a starting byte in the 2 KB of content in search registers 101, and an ending location address pointing to a ending byte in the 2 KB of content in search registers 101, the search returns the starting address (e.g., an 11 bit vector) of the last string before the specified ending location address that matches the masked pattern, providing this address starts after the starting location offset address.

The rule processor also provides a control store or rule memory 104 that contains rules or rule sets to be applied to the payload data. In one embodiment, the memory 104 holds rule sets or sequences of instructions or code that describe patterns, rules, expressions or grammars that need to be applied and detected in search registers 101. The rule vocabulary may specify a range of operations, including, but not limited to, global or local (windowed) searches with either exact matches or partial matches, with individual and multiple match information delivered to some registers, primitives to generate offsets and addresses in the output payload of the rule processor, as well as logical and computational operators to be applied to the search results. Such rules may be composed of multiple fields that specify the various parameters described above. Each parameter may be directly specified within the rule or, alternatively, indirectly specified through the use of a pointer to a register or memory location containing the value to be used. In embodiments where both direct and indirect specifications are permissible, each such field may contain an additional sub-field that indicates whether direct or indirect specification is being utilized.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Exemplary Rule Engine Architecture

A rule processing architecture is described for use in a rule processor for content analysis that allows for parallel and recursive sequencing of rules against the content payload. The architecture provides for parallel pattern matching capability coupled to the capability of making multiple rapid content-based state transitions.

In one embodiment, the rule processor includes an instruction or rule sequencer for applying rules for execution from a program store on content contained in search registers. The rules and the content are consumed by an execution engine that supports a rule vocabulary specifically tailored for one or more operations such as, for example, pattern matching, lexical analysis, parsing and interpretation functions.

In one embodiment, the rule processor performs sequences of prioritized and directed searches of anchored or unanchored patterns and windowed and ranged searches for an arbitrary long pattern starting at any arbitrary location in a document, stream, message, or packet. The patterns as well as the range control and program control flow (e.g., branch addresses) can be specified statically in rules contained in the program store or dynamically selected indirectly from a register file using a pointer or index set forth in a rule. This enables powerful dynamic and contextual pattern matching.

The rule processor performs searches using, in part, a specialized pattern matching hardware structure that is coupled to the search registers. In one embodiment, the rule processor supports rich search, sort, and prioritization functionality. In one embodiment, rule processing hardware is organized as a four-stage pipeline with a search array and sorter block operating directly on 2 Kb of content data (e.g., document data) contained in the search registers. The four stages are: (1) rule fetch from rule memory and rule decode, (2) rule assembly of indirect fields, (3) search execution operations on values in the search registers, and (4) sort operations on the results of the search operations, followed by delivery of results.

The rule processor presents one or more rules of a search to a search register structure. In one embodiment, the search register is a 2 KB register file with each entry being one byte wide. Data to be searched is loaded in the search register file. Each rule specifies a pattern that is presented to the search register file to determine if the pattern is present in the data stored therein. A mask may also be provided to further configure the pattern and/or to reduce the size of the pattern being used in the search.

Figure 2A:
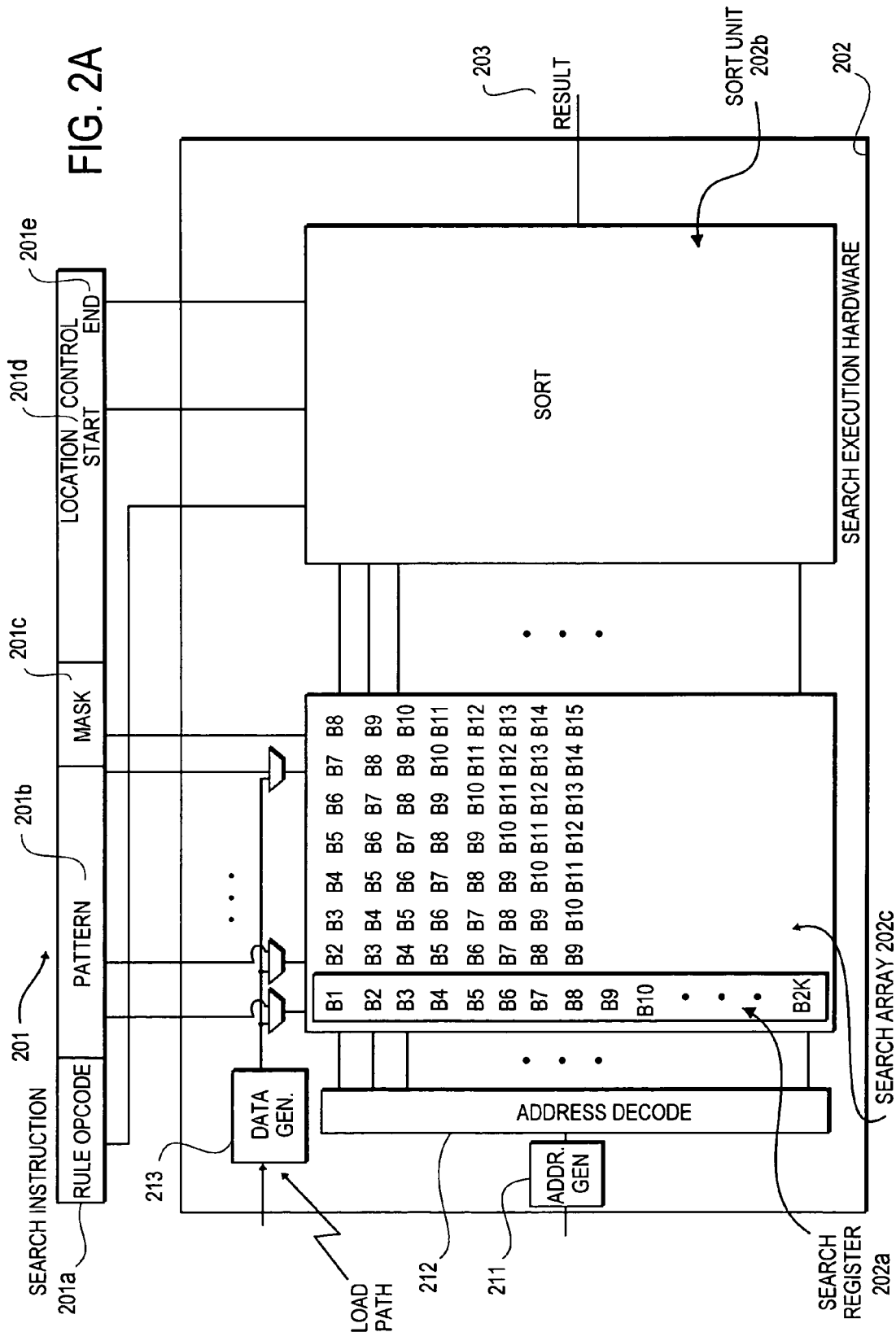
FIG. 2A is a block diagram of one embodiment of a search register and the search execution hardware.

FIG. 1 is a block diagram of one embodiment of a rule processor. Referring to FIG. 1, search registers 101 and search execution hardware 102 is collectively presented with a search instruction 103. Search instruction 103 is further illustrated in FIG. 2A. Referring to FIG. 2A, search instruction 201 comprises an opcode 201a that describes the type of search operation, a search pattern 201b, a mask 201c that specifies the bytes in the pattern that are relevant to the current search instruction and two offsets 201d and 201e that specify the starting and ending bounds, respectively, of the locations in the search register that are relevant to the current search instruction. Search execution unit 202 outputs a result 203 that, in one embodiment, is comprised of an indication of the success of the search operation and additionally includes one or more parameters such as, but not limited to, an index that indicates the location within the search register that met the search instruction of the search operation.

Search execution hardware 202 comprises search register 202a and a sorter 202b as shown in FIG. 2A. Search register 202a stores searchable data, which may be content from a document, message, packet, or any other well-known source of data that can undergo searching. The size of search register 202a may be arbitrary, M bytes, and in one embodiment is organized within a larger array, called a search array 202c, of M rows of N bytes each. Data from search register 202a is stored in a replicated manner inside the search array. This embodiment of the search register may be preferred for multiple reasons including better performance for searches on patterns of N contiguous bytes.

In one embodiment, data to be searched is stored in search register 202a by use of a data generator 213, based on addresses generated from address generator 211, which are decoded by address decoder 212. The process of storing also entails recording the size of the searchable data in search register 202a. For data sets that are smaller in size than the capacity of search register 202a, search register 202a provides a mechanism to restrict the search operation to the appropriate data. In one embodiment, data generator 213 may store a pattern that is established a priori to be data that will be ignored for search operations in the remaining locations of search array 202c or in an alternate embodiment search register 202a disables the appropriate locations of search array 202c from participating in search operations.

In addition to the ability to locate a specified pattern, search register 202a may also provide the capability to perform special searches such as case insensitive searches on character data. To support such and other special searches, search register 202a may store additional information associated with each byte of searchable data. In one embodiment, search register 202a may store special bit vectors associated with each searchable data that allows for case insensitive searches or searches for characters belonging to a pre-defined class of characters.

Irrespective of the manner in which the searchable data is organized throughout search array 202c, search array 202c receives a pattern 201b and mask 201c. Pattern 201b is compared against entries in search array 202c. In one embodiment, search array 202c has M rows of N bytes, where N is the same number of bytes as are in pattern 201b. Mask 201c provides an indication of those bytes in pattern 201b that are not part of the pattern being searched. In other words, if pattern 201b is a pattern that is less than N bytes, mask 201c specifies which bytes of pattern 201b search array 202c is to ignore. In one embodiment, search array 202c has an output line for each of the M rows in search array 202c indicating whether the pattern being searched matched that content data stored in that particular row. In one embodiment, if the output is a 1, the pattern matched content data in the particular row. The M output lines of search array 202c are coupled to inputs of sorter 202b.

Sorter 202b is also coupled to receive offsets 201d and 201e that indicate a starting and ending point, respectively, of a range in search register 202a that is to be searched. In one embodiment, these offsets are $\log_2 M$-bit numbers. Based on the match indication lines from search array 202c and the start and end range as specified by offsets 201d and 201e, sorter 202b processes the results of search array 202c. Such processing may include performing one or more operations. These operations may be index resolution functions that output a specific match index pursuant to the type of operation. In one embodiment, the operations include Find_First_Forward, Find_First_Reverse and Find_Population_Count. The operations are specified by opcode 201a in search instruction 201. Sorter 202b may store intermediate or final results of previous operations that may be used in subsequent operations in conjunction with the match indication lines from search array 202c. In this manner, sorter 202b may be used to progressively navigate through the searchable data set by issuing a series of operations that utilize the results of previous operations. Additionally, sorter 202b may also be coupled to a register file for storage of results of previous operations for use in subsequent operations that may be executed after an arbitrary number of other operations have been executed. The results of sorter 202b may also be coupled to the rule processor instruction sequencer, such as instruction sequencer 105 of FIG. 1, to generate or assist in the generation of rule program offsets (e.g., branch addresses).

After processing, sorter 202b generates outputs indicating whether there is a match, and an index associated with the match. The index may indicate the location (address) in search register 202a where the first match occurs or where the last match occurs with respect to the top of search register 202a. Alternatively, the index may indicate the number of matches that occurred within the range specified by offsets.

Note that the range specified by the offsets may be changed dynamically. For example, a first search instruction may be applied to search array 202c initially while a range that is specified by offset 201d and offset 201e comprises all rows of search array 202c. However, after the first search instruction and a match is identified, the start and end ranges may be changed in a subsequent search instruction such that the searching begins from a location that includes the match lines found within the range specified by the previous search instruction. This capability is achieved by using the indirection functionality that allows fields of a rule or an instruction to reference values in a general purpose register file.

In FIG. 2A, in one embodiment, search array 202c is comprised of 2K rows of 8 bytes each. Thus, search register 202a holds 2K bytes of data. Search array 202c holds replicated data. Each 8-byte string that begins with a distinct byte in search register 202a is stored as a distinct row of bytes in search array 202c. These strings are comprised of the distinct byte from search register 202a and additionally 7 consecutive bytes that follow that byte in search register 202a. Thus, each row of search array 202c holds the 7 most significant bytes of the previous row and additionally one immediately succeeding higher order byte, which is appended to the right of these 7 bytes.

Data is loaded into search array 202c by data generator 213, which, in one embodiment, supplies the appropriate 8 bytes of data for each row from the source data.

Figure 2B:
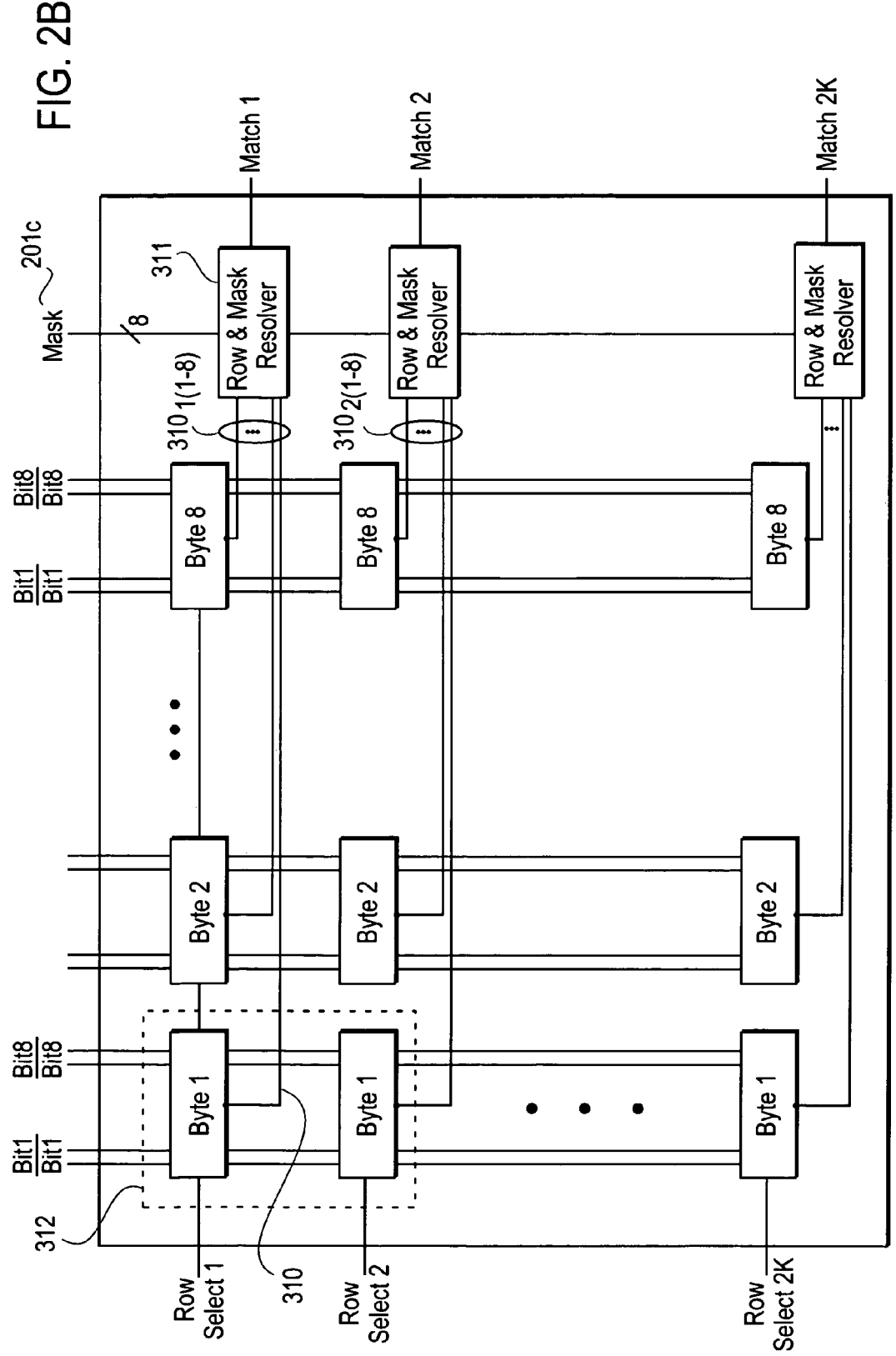
FIG. 2B is a block diagram of one embodiment of a search array.
Figure 4:
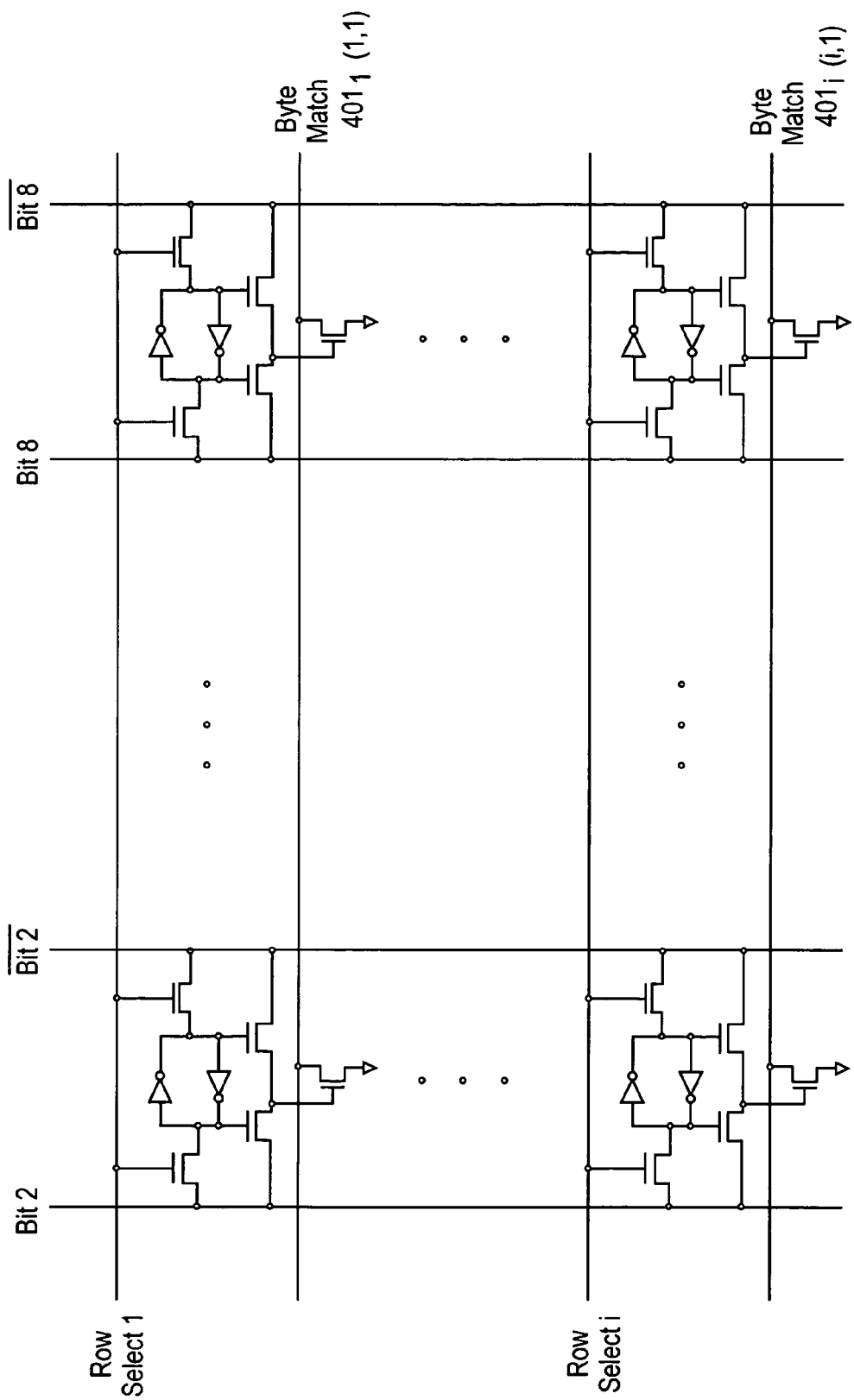
FIG. 4 is a circuit schematic of one embodiment of a search array.

In one embodiment, an 8-byte search pattern is presented in each search instruction. The search pattern is aligned with search array 202c such that each of the 8 columns in the array is presented with a unique byte. This is shown in FIG. 2B. Referring to FIG. 2B, state bytes 1 through 8 are stored in the search array for each of rows 1 through 2K. For each byte that is stored as an element of the search array of 2K rows and 8 columns shown in FIG. 2B, there exists a signal line 310. For example, byte 1 of row 1 generates signal line $310_{11}$, byte 2 of row 1 generates signal line $310_{12}$, byte 1 of row 2 generates signal line $310_{21}$, and so forth. The signal for each byte is asserted during a search operation when the stored byte matches the byte of the search pattern that is presented to the same column that the element belongs to. In this embodiment, where each row contains 8 bytes, 8 signal lines, for example $310_{11}$ through $310_{18}$, are used to indicate each of the byte level matches in the row. The byte level matches for each row are ANDed together with the masks from masks 102c in row & mask resolver blocks 311. The result of the AND function is an indication of whether a match occurred in each row. In this embodiment, where the search array includes 2K rows, 2K match lines are output to the sorter. The circuit structure of two of the byte elements 312 in this array is shown in FIG. 4. The circuit operates in a manner that provides a fully parallel search operation by performing a simultaneous search within all its rows in one clock period. When a search operation is conducted, all byte level match lines 401 in a column simultaneously indicate matches with their respective stored bytes. A search operation is invoked on all columns simultaneously allowing the masked reduction block in each row to indicate a row level match. Thus, in this embodiment of the search array, in a single clock, a parallel search of all 2K strings in the search register that are comprised of 8 contiguous bytes is performed and the results are indicated on the 2K match lines.

Figure 3A:
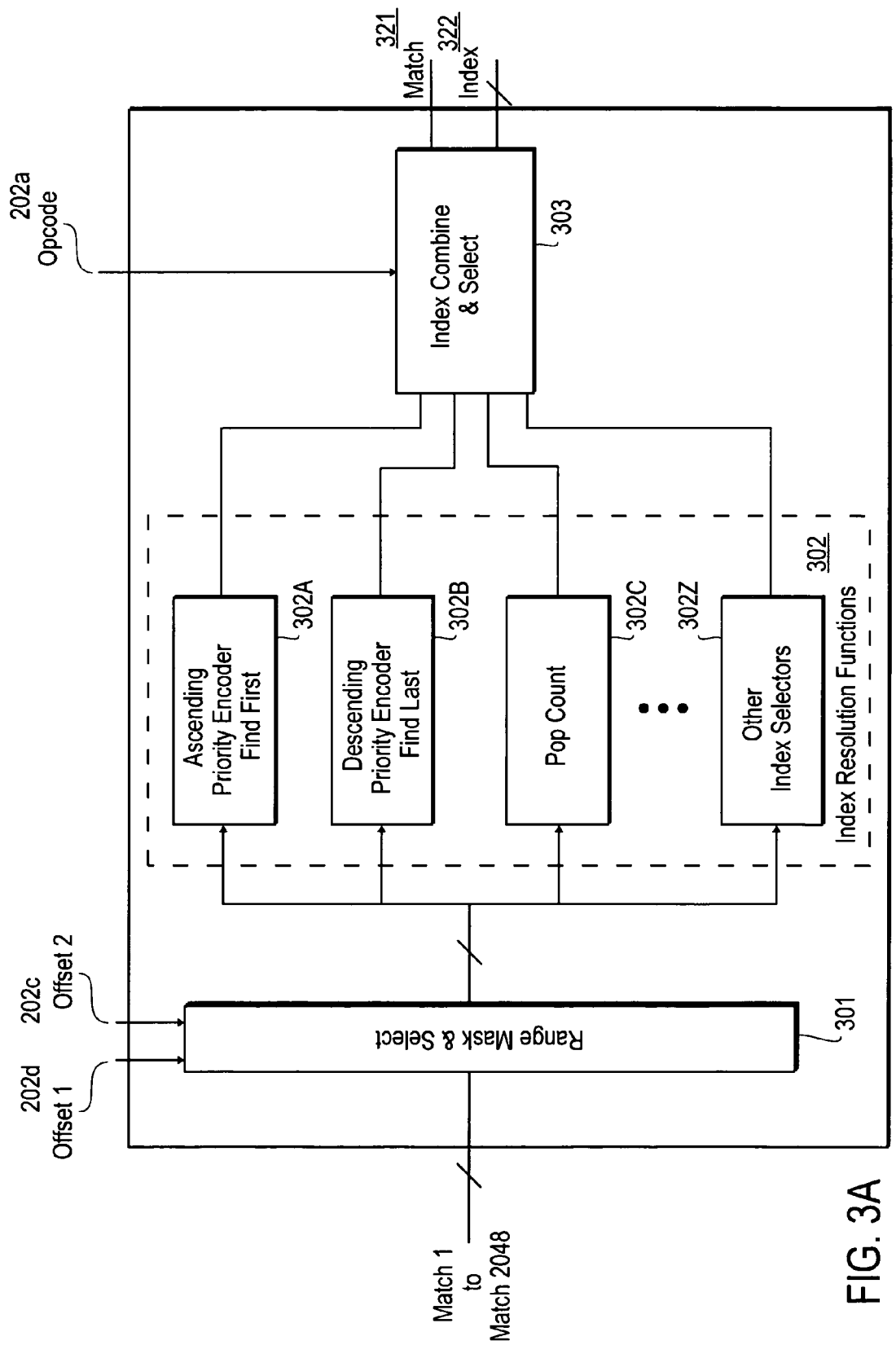
FIG. 3A is a block diagram of one embodiment of a sorter.
Figure 3B:
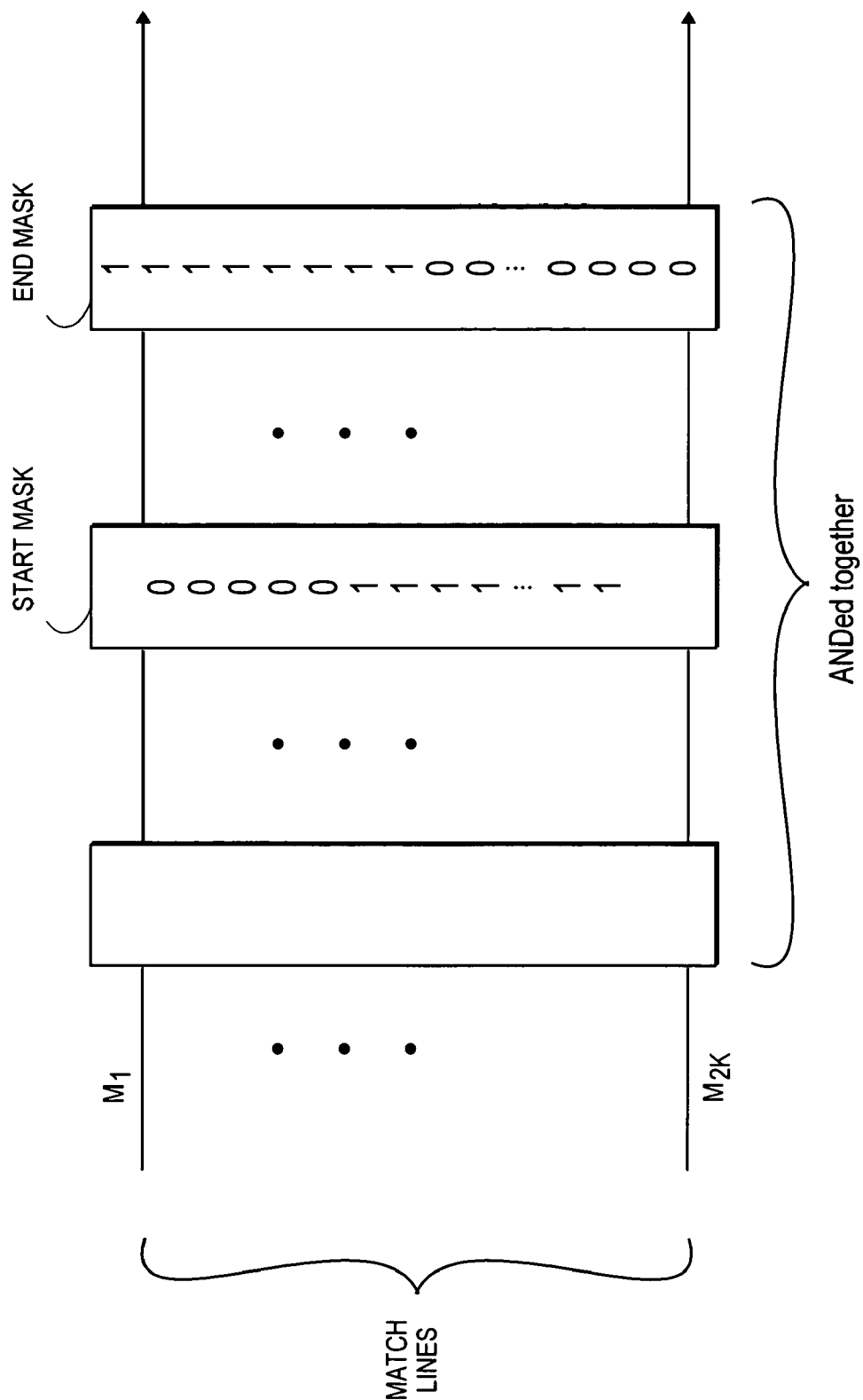
FIG. 3B is a block diagram of one embodiment of a range select mechanism in a sorter.

FIG. 3A is a block diagram of one embodiment of a sorter. Referring to FIG. 3A, match lines 310 from the search array are coupled to and input to a range mask and select unit 301. In one embodiment, match lines 310 comprise match 1 to match 2048. Range mask and select unit 301 receives a pair of offsets specifying a range of rows of the M match lines from search array to perform further processing. In one embodiment, the offsets are 11 bit numbers that are converted into 2K mask bits that may be ANDed together with the match lines to provide an output. Such an example is shown in FIG. 3B in which the offset for the start range is converted to one or more zeros with the remainder of the bits being a one bit, while the offset for the end of the range is converted to all zeros starting from the bottom up to a certain point after which all bits are ones. By ANDing these registers with the match lines, the matches that occur within the specified start and ending range are output without change, while other match lines outside the range are masked (e.g., changed to a predetermined logic level).

The output of range mask and the select unit 301 is coupled to the inputs of index resolution functions unit 302. In one embodiment, index resolution functions unit 302 includes one or more functions that are performed on the outputs of range mask and select unit 301. For example, as shown, the sorter includes an ascending priority encoder 302A to find the first occurrence (with respect to the top of the search array) of a match between the specified pattern of N bytes and the content data in the search array as indicated by the non-masked match lines. A descending priority encoder 302B may also be included to find the last occurrence (with respect to the top of the search array) of a match between the N byte pattern and the content data in the search array as indicated by the non-masked match lines. A population counter 302C indicates the number of matches that occur between the N byte pattern and the data in the search array as indicated by the non-masked match lines. Other index selectors 302Z may also be used.

The outputs of index resolution functions unit 302 are input to an index combine and select unit 303, which is also coupled to receive opcode 102a. The opcode 102a is specified in the search instruction and selects one of the index resolution function outputs as the output of the sorter. Index combine and select unit 303 generates a match indicator 321 indicating that there was match along with an index 322 indicating that the location within the search array of the data that is either the first occurrence of a match if the output ascending priority encoder 302A is selected, the last occurrence of a match in case the output of descending priority indicator 302B is selected, indicates the number of matches in the non-masked match lines if the pop counter 302C is selected, etc. Following the computation of the outputs, namely, match indicator 321 and index 322, they may be utilized to control the execution of one or more search instructions that follow by storing the outputs in general-purpose registers and utilizing indirect specification in subsequent instructions, branching to a specified address in the instruction memory (e.g., instruction memory 104) dependent on the match indicator 321 or other similar techniques.

Figure 5:
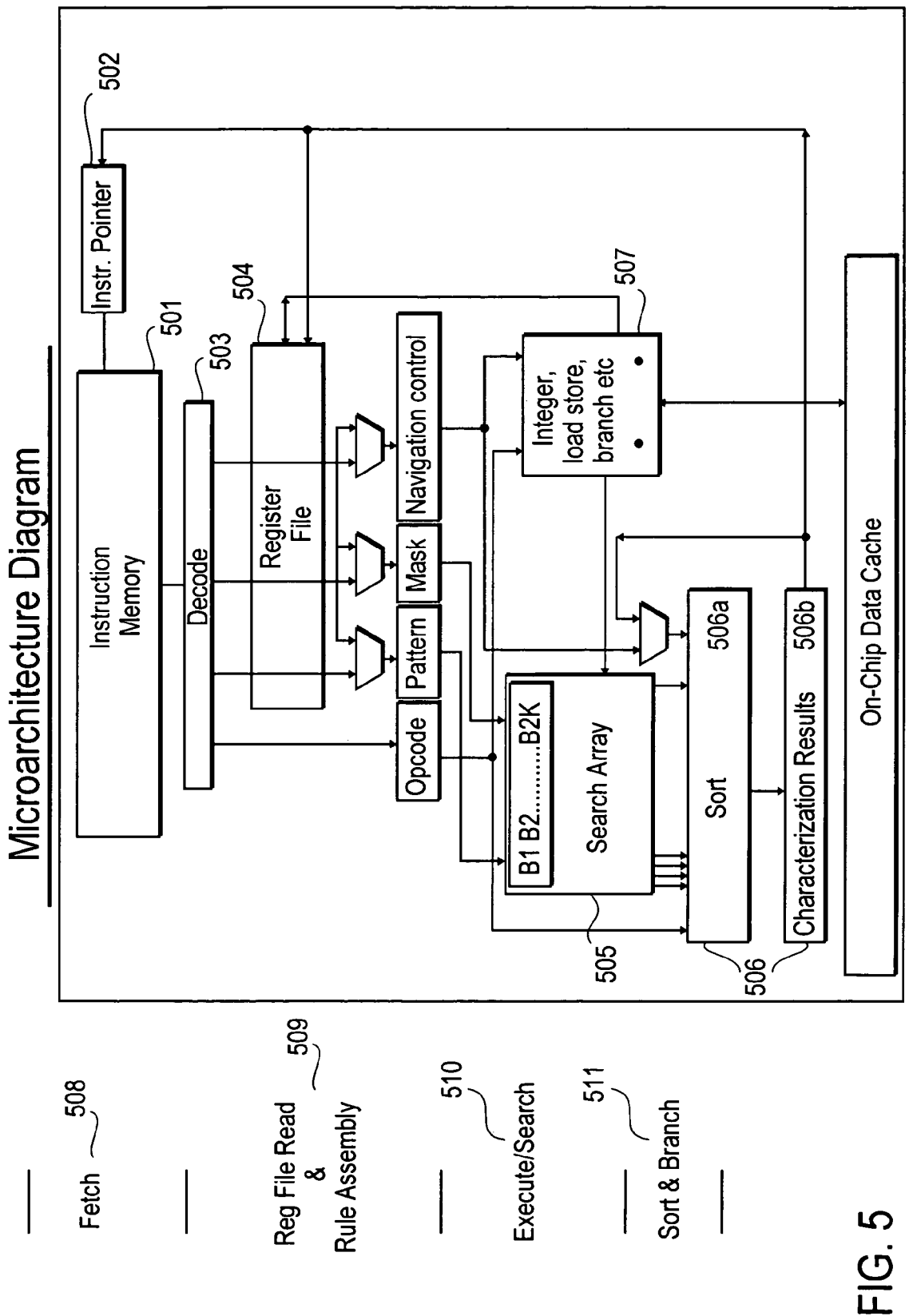
FIG. 5 illustrates an exemplary micro-architecture of a rule processor comprising of four processing stages.

FIG. 5 illustrates the micro architecture of a rule processor that includes search apparatus. Referring to FIG. 5, the search instructions are stored in an instruction memory 501. Instructions are selected by flow control using an instruction fetch pointer register 502. Instructions are decoded by a decoder 503. The individual subsets of each instruction are either taken from the instruction or fetched from general purpose register file 504. Then the various subsets of each instruction are supplied to the separate units, namely, search array 505, sorter 506 comprising of a sort unit 506a followed by a characterization unit 506b, a conventional arithmetic logic unit (ALU) 507, as set forth above. In one embodiment, the processing of each instruction follows a 4-stage pipeline consisting of (i) instruction fetch stage 508, (ii) an instruction assembly stage 509, (iii) a search/execute stage 510, and (iv) a sort and delivery of results and/or branch stage 511 as described earlier.

In one embodiment, the rule engine instruction format comprises 128-bit rule format. The 128 bits of the rule are divided into subsets that contain various fields to issue directives to various hardware engines on the rule processor. In one embodiment, the search subset contains a search/sort opcode field (5 bits), a pattern field (in one embodiment, this is 65 bits, containing an 8 byte value or a pointer to a location that provides an 8 byte value along with an additional bit that specifies whether the 8 byte value in the instruction is a pointer or not), a byte level mask field (in one embodiment, 8 bits), a start location address field (in one embodiment this field is 12 bits, comprising an 11 bit value or a pointer to a register that provides an 11 bit value, and including an additional bit to indicate whether the start location address contains the 11 bit value or such a pointer), an end location address field (in one embodiment, this field is 12 bits, comprising an 11 bit value, or a pointer to a register that provides an 11 bit value, with an additional bit to specify whether the end location address information is a pointer or not), a result register field that specifies where the results of the search operations are to be returned (in one embodiment, this field is 6 bits) and a branch address field (in one embodiment this field is 20 bits, comprising a 19 bit value or a pointer to a register that provides a 19 bit value, with an additional bit to specify whether the branch address information is a pointer or not)

FIG. 6 illustrates an example pseudo-code 601 of a rule-set that may be processed by one embodiment of the rule processor described above. The rule has multiple patterns with some specific constraints on the locations of where such patterns may exist in a message or document or packet. The constraints are expressed in the pseudo-code through the use of key words such as BEFORE and AND. For purposes of simplicity, the patterns in 601 are used in this example without any additional delimiters between strings, which may be the case in practice. Also, in FIG. 6 is a listing 602 of the corresponding micro-code for the exemplary rule processor. The format of the instructions is as described earlier. Using the first instruction 603 for illustration, it consists of the FIND_FIRST_FORWARD opcode where all 8 bytes of the Pattern "cp /bin/" are relevant for the search (through the use of 0×FF as Mask) with the start and end offsets expressed as constant values (through the use of Indirection Flags) to denote the start and end of the searchable payload held in the search registers. For purposes of brevity, the derivation of the constant numbers has been skipped here. The result of this opcode is shown to be loaded into general purpose register A and lastly the branch address is specified as the constant value of 11 which is the instruction that would follow the microcode snippet shown in FIG. 6. This instruction will cause the search execution hardware to search for the occurrence of "cp /bin/" within byte locations 0×03D and 0×800 of the search registers 202a. All rows in the search array 202c that match will assert their respective match lines 310 by the end of the search execution stage 510 of the micro-architectural pipeline. In the sort and branch stage 511, the sorter 202b converts 0×03D and 0×800 into bit vectors as illustrated in FIG. 3B. The bit vectors are used to perform the range mask and select function 301 to negate any matches that start outside of the location window from 0×03D to 0×800. Of the remaining matches that are now within the location window, the opcode of this instruction chooses the ascending priority encoder 302a from the index resolution functions 302 to convert the lowest numbered match into an 11-bit binary encoded location. If such a match was found, match 321 would be asserted and index 322 would hold the 11-bit location. If match 321 were to be not asserted because a match was not found, the instruction sequencer 105 would load the branch address 0xB into the instruction pointer 106. Index 322 would be loaded into general-purpose register A by the control circuitry of the register file 504. The load into general-purpose register A and the load of the instruction pointer, if applicable, will be completed by the end of the sort and branch execution stage 511. Second instruction 604, FIND_FORWARD_ANCHORED, further illustrates the rich vocabulary of the exemplary rule engine. It is a variant of FIND_FIRST_FORWARD in that the match must begin at the start_offset for the search to be successful.

FIG. 7 illustrates the execution of the micro-code shown in FIG. 6 within the micro-architecture of the exemplary rule processor shown in FIG. 5. Table 701 shows the execution across multiple clock cycles. For purposes of simplicity, it is assumed that all the search instructions are successful in finding the specified patterns in the search registers. The execution proceeds in a pipelined fashion through the 4 stages described in FIG. 5. Through the use of indirect specification, the execution of a search instruction can use the offsets calculated in the immediately preceding instruction. Therefore, instructions 1 through 8 are executed in consecutive cycles. Instruction 8 is a branch dependent on the result of the comparison of the contents of general purpose register A and general purpose register B which are computed in clock cycle 8 and clock cycle 9 respectively. The branch is taken in clock cycle 11 and the instruction execution completed in clock cycle 14. Thus, the complex pattern matching expression described using pseudo-code 601 is executed in only 14 clock cycles using the rich instruction vocabulary of the exemplary rule processor. This example illustrates the capability and efficiency of the exemplary rule processor on execution of functions that include dynamic and contextual search and analysis of documents, messages or packets.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

We claim:

1. A system for conducting contextual searches, the system comprising:
a rule processor comprising:
a plurality of M input payload search registers, wherein a data stream of content data to be searched is input into the plurality of payload search registers;
a search execution engine comprising:
a search array coupled to the plurality of M search registers, wherein the search array comprises:
a plurality of M rows of search array elements coupled to a plurality of M output match lines; and
a plurality of N columns of search array elements coupled to a plurality of N pattern input lines comprising a search pattern, wherein the search array comprises an array of M by N search array elements, and wherein the content data in the plurality of M search registers is replicated and stored N times in the plurality of N columns in the search array, wherein the N content data in each column of the N columns are shifted in row positions relative to the row positions of the content data in each of the other columns of the N columns; and
a sorter coupled to the search array to perform one or more contextual searches on content in the search array via parallel pattern matching in response to executing one or more search instructions specifying the one or more pattern searches and presenting one or more patterns to the content, wherein the parallel pattern matching comprises performing a simultaneous search within all M rows for all of the N search pattern elements input by the N pattern input lines, all in one clock period.

2. The system defined in claim 1 wherein fields of the one or more search instructions are coupled to the plurality of search registers and the search execution engine.

3. The system defined in claim 1 wherein at least one of the one or more search instructions specifies a pattern that is to be searched against the content in the search array and zero or more search parameters.

4. The system defined in claim 3 wherein one parameter specifies a portion of the pattern to be masked to enable a subset of the pattern to be searched against the content in the search array.

5. The system defined in claim 4 wherein the portion of the pattern to be masked is specified by a mask vector to mask off specific bytes in the pattern.

6. The system defined in claim 4 wherein the zero or more parameters specify starting and ending locations that constitute a range of the content within the search array within which the search execution engine is to constrain a search.

7. The system defined in claim 4 wherein the at least one of the instructions specifies a windowed-find-first-forward search.

8. The system defined in claim 4 wherein the at least one of the instructions specifies a windowed-find-first-reverse search.

9. The system defined in claim 1 wherein the search execution engine generates at least one result output indicative of success in searching the content in the search array.

10. The system defined in claim 9, wherein the at least one result output comprises an indication of whether or not a match occurred between a pattern specified in at least one of the instructions and the content in the search array.

11. The system defined in claim 9, wherein the at least one result output comprises an indication of a location in the search array where a match occurred between a pattern specified in at least one of the instructions and the content in the search array.

12. The system defined in claim 1 wherein at least one search instruction includes a field that specifies a parameter to use to control the search or a pointer into a memory that stores the parameter to control the search.

13. The system defined in claim 12 wherein the pointer points to a general purpose register.

14. The system defined in claim 12 wherein a value to which the pointer points is a result of a previously performed search by a search execution hardware.

15. The system defined in claim 12 wherein the parameter corresponds to one of a group that includes a mask, a search window parameter, and a control parameter.

16. The system defined in claim 1 wherein the plurality of input payload search registers comprises a register file.

17. The system defined in claim 16 wherein the register file comprises 2K entries of one byte each.

18. The system defined in claim 16 wherein the register file comprises a plurality of entries addressed by 11-bit register addresses.

19. The system defined in claim 1 further comprising a memory to store one or more search instructions to be applied to content in the search array.

20. The system defined in claim 1 wherein the search instructions cause the search execution engine to perform searches for arbitrarily long patterns in the content in the search array.

21. The system defined in claim 1 further comprising an instruction sequencer for applying one or more search instructions to the search execution engine.

22. The system defined in claim 21 wherein the one or more search instructions specify at least one pattern, range control, and program control flow.

23. The system defined in claim 21 wherein the one or more search instructions include a pointer to specify a memory location that stores information that specifies at least one pattern, range control, and program control flow.

24. The system defined in claim 21 wherein at least one search instruction in the one or more search instructions comprises opcode information to indicate a search operation type, pattern information to specify a pattern to be located, a mask to specify a portion of the pattern information that comprises the pattern, and a pair of offsets to specify starting and ending bounds of locations in the search registers for the search for the at least one search instruction.

25. The system defined in claim 1 wherein the search execution engine comprises a first output indication indicative of search success of execution of one search instruction and a second output indication indicative of a location within the search registers of a pattern specified by the one search instruction.

26. The system defined in claim 1 wherein the search array comprises M match lines with each of the M match lines associated with a group of data stored in the search array and being indicative of whether a pattern specified by one of the one or more search instructions matches data in its associated group of data stored in the search array.

27. The system defined in claim 26 wherein the sorter is coupled to receive the M match lines to perform the one or more operations associated with matches indicated by the M match lines.

28. The system defined in claim 27 wherein the information specifies a range, and the sorter sorts the M match lines only in the specified range.

29. The system defined in claim 28 wherein the range is specified in the search instruction.

30. The system defined in claim 28 wherein the information specifies a location in a memory at which the range is stored.

31. The system defined in claim 30 wherein the memory is a register file.

32. The system defined in claim 1 wherein the search array comprises a first input to receive bits including the pattern and a second input for a mask, the search array to mask zero or more bits of the bits corresponding to the pattern based on the mask.

33. The system defined in claim 32 wherein the bits including the pattern comprises N bytes and the mask comprises N bits, each of the N bits being associated with a different one of the N bytes, wherein the search array masks one of the N bytes of the pattern when its associated bit of the N bit mask is in a first state.

34. The system defined in claim 1 wherein the sorter has a first output indicating whether one or more of the match lines match and a second output indicative of a result of performing the one or more operations.

35. The system defined in claim 34 wherein the second output is indicative of a location into the search array of a first occurrence of a match between the pattern and data stored in the search array in relation to one side of the search array.

36. The system defined in claim 34 wherein the second output is indicative of a number of matches in a range of the M match lines.

37. The system defined in claim 1 wherein the sorter operates in response to a range mask to mask out one or more outputs of the search array for a search operation.

38. The system defined in claim 1 wherein the sorter further comprises:
a priority encoder to identify a location in the search array corresponding to the M match lines corresponding to a first occurrence of a match between the pattern and data stored in the search array in relation to one side of the search array.

39. The system defined in claim 38 wherein the priority encoder is an ascending priority encoder and the one side of the search array is the top of the search array.

40. The system defined in claim 38 wherein the priority encoder is a descending priority encoder and the one side of the search array is the bottom of the search array.

41. The system defined in claim 1 wherein the sorter further comprises a counter to determine a number of matches in the search array.

42. The system defined in claim 1 wherein the sorter further comprises:
an ascending priority encoder to identify a location in the search array corresponding to the M match lines corresponding to a first occurrence of a match between the pattern and data stored in the search array in relation to a top side of the search array;
a descending priority encoder to identify a location in the search array corresponding to the M match lines corresponding to a first occurrence of a match between the pattern and data stored in the search array in relation to a bottom side of the search array;
a counter to determine a number of matches in a range of the M match lines; and
a selector coupled to the ascending priority encoder, the descending priority encoder and the counter and having a first output, the selector operable to select an output of the ascending priority encoder, the descending priority encoder and the counter as the first output of the sorter.

43. The system defined in claim 42 wherein the selector has a second output indicating if a match occurred between the pattern and data in the search array.

44. The system defined in claim 1 wherein the search array comprises:
a plurality of rows of memory locations to store bytes of data;
a plurality of rows of byte comparators to compare bytes of the data stored in the plurality of rows of memory locations with bytes of the pattern, each comparator of the plurality of rows of byte comparators having an output;

a plurality of masked reduction units, each of the plurality of masked reduction units coupled to receive byte masks and comparator outputs of comparators in one row of byte comparators, the plurality of masked reduction units masking individual comparator outputs based on the byte masks and combining unmasked comparator outputs for each row into one of a plurality of mask lines.

45. The system defined in claim 1 further comprising:
a rule memory to store a plurality of rules;
a rule sequencer coupled to the rule memory to select one or more rules for execution; and
a decoder to decode the one or more rules selected by the rule sequencer, the decoder coupled to the search array and sorter to provide decoded information to the search array and the sorter.

46. The system of claim 1, wherein the search array performs pattern matching between data stored in the search array and an N byte pattern from a search instruction received on a first input, the search array having M match lines as outputs with each of the M match lines associated with a group of data stored in the array and being indicative of whether the N byte pattern matches data stored in its associated group of data stored in the search array, and wherein the sorter receives the M match lines to perform one or more operations associated with matches indicated by the M match lines, the one or more operations being performed in response to information specified by the rule, and further wherein the sorter outputs data indicative of any match found.

47. The system defined in claim 46, wherein the sorter has a first output indicating whether one or more of the match lines match and a second output indicative of a result of performing the one or more operations.

48. The system defined in claim 46 wherein the search array includes a second input to receive an N bit mask to apply to the N byte pattern.

49. The system defined in claim 46 wherein the sorter comprises a range mask to mask out a portion of the M mask lines based on a range.

50. The system defined in claim 49 wherein the range mask logically ANDs the M mask lines with a pair of offsets specified by the search instruction.

51. The system defined in claim 50 wherein the rule includes the pair of offsets.

52. The system defined in claim 49 wherein the rule includes a pointer to a location in a memory where the offsets are stored.

53. The system defined in claim 46 wherein the data output for the sorter is feedback for use and an input to the sorter in the next cycle.

54. The system defined in claim 46 wherein the sorter further comprises:
a priority encoder to identify a location in the search array corresponding to the M match lines corresponding to a first occurrence of a match between the pattern and data stored in the search array in relation to one side of the search array.

55. The system defined in claim 54 wherein the priority encoder is an ascending priority encoder and the one side of the search array is the top of the search array.

56. The system defined in claim 54 wherein the priority encoder is a descending priority encoder and the one side of the search array is the bottom of the search array.

57. The system defined in claim 46 wherein the sorter further comprises a counter to determine a number of matches in a range of the M match lines.

58. The system defined in claim 46 wherein the sorter further comprises:
an ascending priority encoder to identify a location in the search array corresponding to the M match lines corresponding to a first occurrence of a match between the pattern and data stored in the search array in relation to a top side of the search array;
a descending priority encoder to identify a location in the search array corresponding to the M match lines corresponding to a first occurrence of a match between the pattern and data stored in the search array in relation to a bottom side of the search array;
a counter to determine a number of matches in a range of the M match lines; and
a selector coupled to the ascending priority encoder, the descending priority encoder and the counter and having a first output, the selector operable to select an output of the ascending priority encoder, the descending priority encoder and the counter as the first output of the sorter.

59. The system defined in claim 54 wherein the selector has a second output indicating if a match occurred between the pattern and data in the search array.

60. The system defined in claim 46 wherein each of the N bits is associated with a different one of the N bytes, wherein the search array masks one of the N bytes of the pattern when its associated bit of the N bit mask is in a first state.

61. The system defined in claim 46 wherein the information specifies a range, and the sorter sorts the M match lines only in the specified range.

62. The system defined in claim 61 wherein the range is specified in the search instruction.

63. The system defined in claim 61 wherein the information specifies a location in a memory at which the range is stored.

64. The system defined in claim 46 wherein the search array comprises:
a plurality of rows of memory locations to store bytes of the data;
a plurality of rows of byte comparators to compare bytes of the data stored in the plurality of rows of memory locations with bytes of pattern, each comparator of the plurality of rows of byte comparators having an output;
a plurality of masked reduction units, each of the plurality of masked reduction units coupled to receive byte masks and comparator outputs of comparators in one row of byte comparators, the plurality of masked reduction units masking individual comparator outputs based on the byte masks and combining unmasked comparator outputs for each row into one of the M mask lines.

65. The system defined in claim 46 further comprising:
a rule memory to store a plurality of search instructions;
a rule sequencer coupled to the search instruction memory to select one or more search instructions for execution; and
a decoder to decode the one or more search instructions selected by the rule sequencer, the decoder coupled to the search array and sorter to provide decoded information to the search array and the sorter.

66. A process comprising:
loading a set of input payload search registers with content data;
storing a replication of the content data in the payload search registers in a search array coupled to the registers, wherein the search array comprises:
a plurality of M rows of search array elements coupled to a plurality of M output match lines; and a plurality of N columns of search array elements coupled to a plurality of N pattern input lines comprising a search pattern, wherein the search array comprises an array of M by N search array elements, and wherein the storing of the replication of content comprises replicating and storing the content in the M input payload search registers a plurality of times, in the plurality of N columns of search array elements, wherein the N content data in each column of the N columns are shifted in row positions relative to the row positions of the content data in each of the other columns of the N columns;

presenting by means of the plurality of N pattern input lines a pattern identified by a search instruction to be searched in the search registers;

performing parallel pattern matching between the pattern and the content stored in the search array, wherein the parallel pattern matching comprises performing a search query simultaneously within all M rows for all of the N search pattern elements input by the N pattern input lines, all in one clock period; and outputting by means of the plurality of M output match lines an indication of a result of performing the pattern matching.

67. The process defined in claim 66 further comprising:

generating a plurality of match lines associated with rows of the search array, wherein match lines of the plurality of match lines indicating whether a match occurred between the pattern and data in a row associated with one of the match lines;

performing the one or more operations on at least a set of the match lines in response to information specified by the search instruction;

outputting an indication as to whether one or more of the match lines match the pattern and a result of performing the one or more operations.

68. The process defined in claim 66 wherein loading the search registers is performed to store, replicate, and interleave data such that data for one row is stored in an adjacent row in shifted form.

69. The process defined in claim 66 further comprising:

converting code into a sequence of search instructions;

executing the sequences of search instructions in consecutive cycles such that pattern matching is performed for each of the plurality of search instructions.

70. A process for performing contextual searches in a pipelined fashion, the process comprising:

fetching a rule from a rule memory;

decoding the rule and assembling indirect fields, if any;

storing a replication of content in a plurality of input payload search registers in a search array coupled to the registers, wherein the search array comprises:

a plurality of M rows of search array elements coupled to a plurality of M output match lines; and a plurality of N columns of search array elements coupled to a plurality of N pattern input lines comprising a search pattern, wherein the search array comprises an array of M by N search array elements, wherein the storing of the replication of content comprises replicating and storing the content in the M input payload search registers N times, once in each of the N columns of search array elements, wherein the row positions of the replicated content within each column of the N columns of search array elements is shifted relative to the row positions of the replicated content in each of its adjacent columns of search array elements;

executing one or more search operations on values in the search array; and performing sort operations on results of executing the one or more search operations.

71. The process defined in claim 70 wherein the process is performed in a four stage pipeline with a search array and a sorter.

* * * * *